United States Patent [19]
Nace

[11] Patent Number: 6,120,167
[45] Date of Patent: Sep. 19, 2000

[54] LIGHT SOURCE ASSEMBLY FOR MOTORCYCLE TAIL LIGHT

[75] Inventor: John E. Nace, Camp Hill, Pa.

[73] Assignee: Harley-Davidson Motor Company, Wis.

[21] Appl. No.: 09/122,351

[22] Filed: Jul. 24, 1998

[51] Int. Cl.[7] .............................. B62J 6/00; F21V 33/00
[52] U.S. Cl. ...................... 362/473; 362/475; 362/476; 362/548; 362/549
[58] Field of Search .................................. 362/226, 473, 362/475, 476, 548, 549, 374, 375

[56] References Cited

U.S. PATENT DOCUMENTS

| | | | |
|---|---|---|---|
| 4,380,793 | 4/1983 | Potts | 362/267 |
| 4,794,500 | 12/1988 | Bradley | 362/226 |
| 4,822,302 | 4/1989 | Dorleans | 439/544 |
| 5,442,525 | 8/1995 | Tsukada | 362/61 |
| 5,463,541 | 10/1995 | Greene | 362/369 |

OTHER PUBLICATIONS

Harley–Davidson, Inc. 1993 and 1994 1340cc Models Parts—p. 252.

*Primary Examiner*—Cassandra Spyrou
*Assistant Examiner*—Leo Boutsikaris
*Attorney, Agent, or Firm*—Michael Best & Friedrich LLP

[57] ABSTRACT

The present invention is a motorcycle tail light comprising a housing, a lens and a light source assembly. The light source assembly includes a resilient base and a light source detachably mounted to the base. The resilient base dampens vibrations which are transferred to the light source through the housing of the tail light. The resilient base of the present invention may also have an asymmetrical shape to ensure that the light source is properly aligned within the tail light. In addition, the base may also include one or more resilient ribs adapted to compress when the base is mounted within the housing of the tail light. The rib configuration permits easy insertion of the base into the housing while making withdrawal of the base from the housing more difficult. The light source assembly also includes an elastomer member positioned between the base and the light source to further dampen the vibrations that reach the light source.

7 Claims, 13 Drawing Sheets

LIGHT SOURCE ASSEMBLY FOR MOTORCYCLE TAIL LIGHT

FIELD OF THE INVENTION

This invention relates to motorcycle tail lights, and more particularly to a light source assembly for motorcycle tail lights.

BACKGROUND OF INVENTION

Motorcycle tail lights typically include a light source assembly that is rigidly attached to the support structure of the tail light. A conventional light source assembly is usually mounted to the support structure of the tail light without any consideration for the alignment of the light source within the tail light. In addition, known light source assemblies commonly use a metal spring to bias the light source in a secure electrically connected position within the light source assembly.

SUMMARY OF THE INVENTION

The rigid attachment of the light source within the tail light facilitates the transfer of vibrations from the frame of the motorcycle to the light source via the support structure of the tail light. In addition, the inability to align the light source within the tail light during assembly is often a great concern because sometimes the orientation of the light source is critical to the operation of the tail light. The metal springs regularly used in a light source assembly can become corroded, wear due to fatigue and often make assembly of the tail light more difficult. Using metal springs also facilitates the transfer of vibrations to the light source. Finally, there are problems associated with assembling a light source assembly within a tail light. Such problems make the repair or replacement of the light source assembly within the tail light quite cumbersome.

The present invention is embodied in a motorcycle tail light that comprises a housing, a lens and a light source assembly. The lens and light source assembly are both mounted to the housing. The light source assembly includes a resilient base and a light source detachably mounted to the base. The resilient base serves to dampen the vibrations transferred to the light source from the housing of the motorcycle tail light.

The housing of the motorcycle tail light may also include an asymmetrical opening such that the base (due to its identical asymmetrical shape) can only be mounted into the opening in a simple position. This feature of the present invention assures that the light source is properly aligned within the tail light when orientation of the light source is critical to the operation of the tail light.

The base of the light source assembly may also include at least one resilient rib. The rib(s) are adapted to compress when the base is mounted into the opening of the housing eliminating the need for additional fasteners in order to secure the light source assembly to the housing. The configuration of the rib(s) permit for easy insertion of the base into the opening while making more difficult (although still possible) the removal of the base from the housing.

The base may further include a stop portion which is larger than the opening. The stop portion prevents the complete insertion of the base into the opening and serves to axially align the light source within the motorcycle tail light.

The light source assembly may also include an elastomer member positioned between the base and the light source to further dampen the vibrations that reach the light source.

The elastomer member may be capable of receiving wires therethrough for electrically connecting the light source. The elastomer member may also extend through an opening in the base and act as a seal for the opening when the elastomer member is compressed between the light source and the base.

Other principal features and advantages of the invention will become apparent to those skilled in the art upon review of the following drawings, the detailed description and the attached claims.

DETAILED DESCRIPTION

Figure 1:
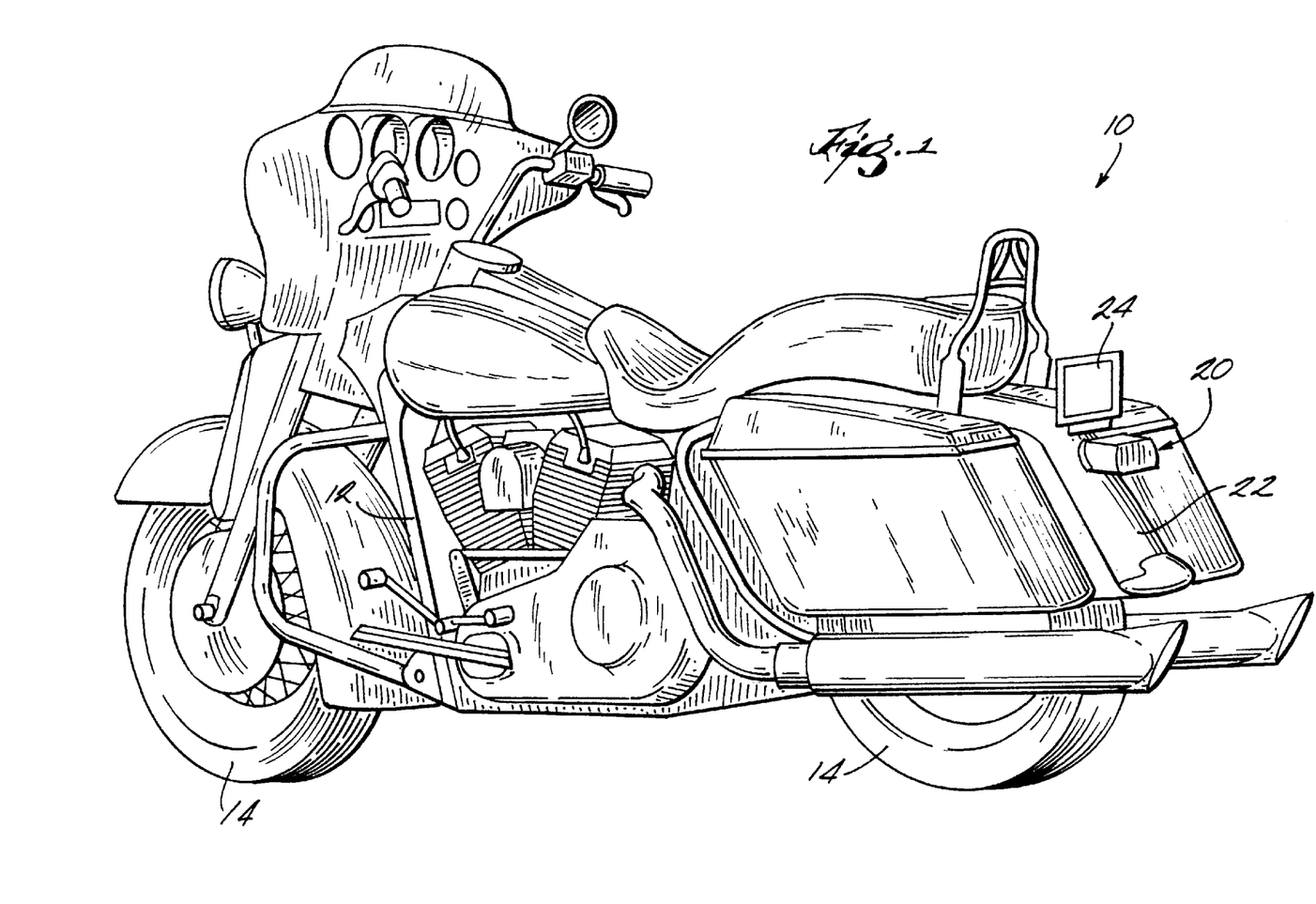
FIG. 1 is a rear perspective view of a motorcycle having a tail light embodying the present invention.
Figure 2:
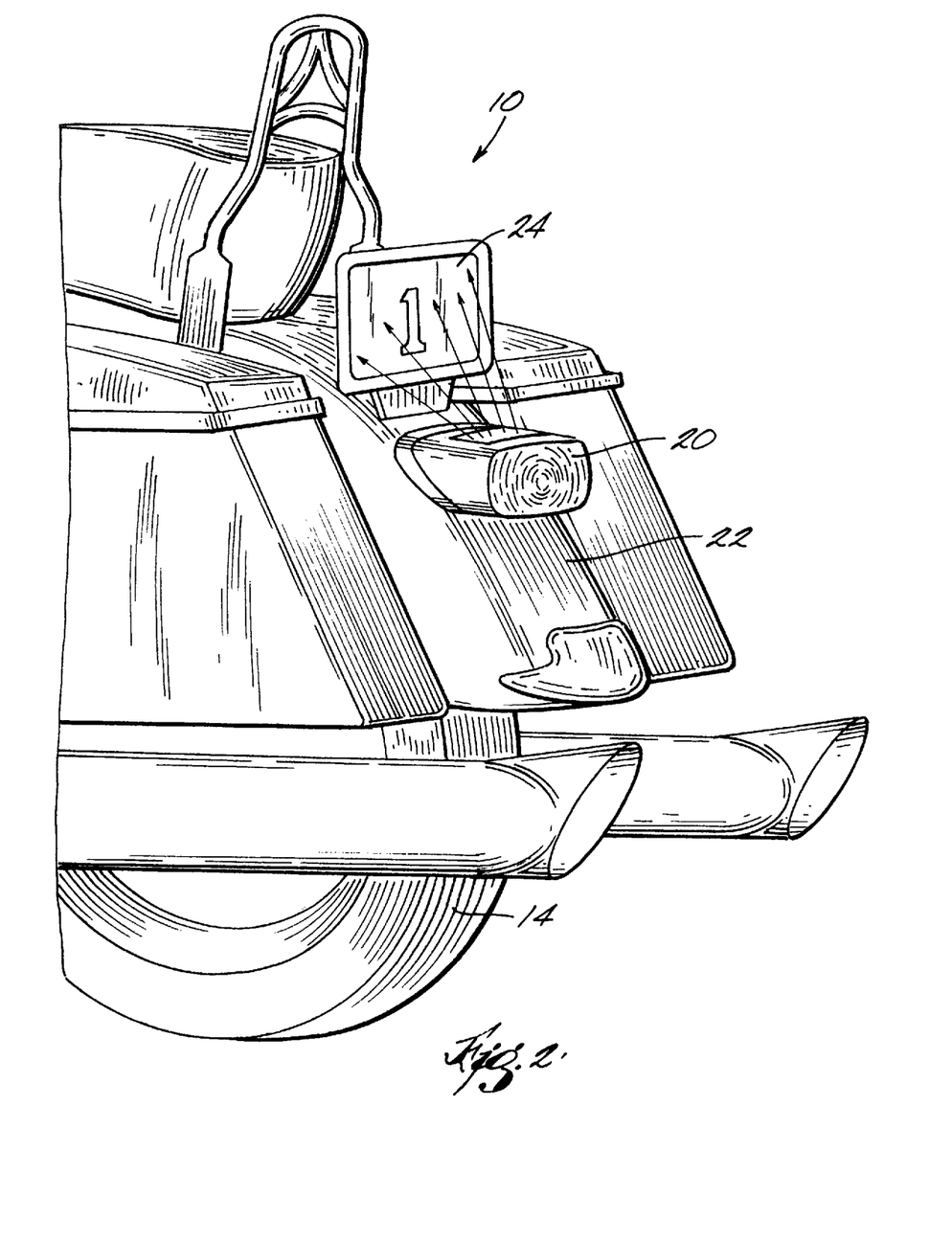
FIG. 2 is an enlarged rear perspective view of the motorcycle of FIG. 1.

FIGS. 1 and 2 show a motorcycle 10 that includes a frame 12, wheels 14 and a tail light 20 mounted on a rear fender 22 of the motorcycle 10. In the illustrated embodiment, a license plate 24 is mounted above the tail light 20 such that the tail light 20 illuminates the license plate 24.

Figure 3:
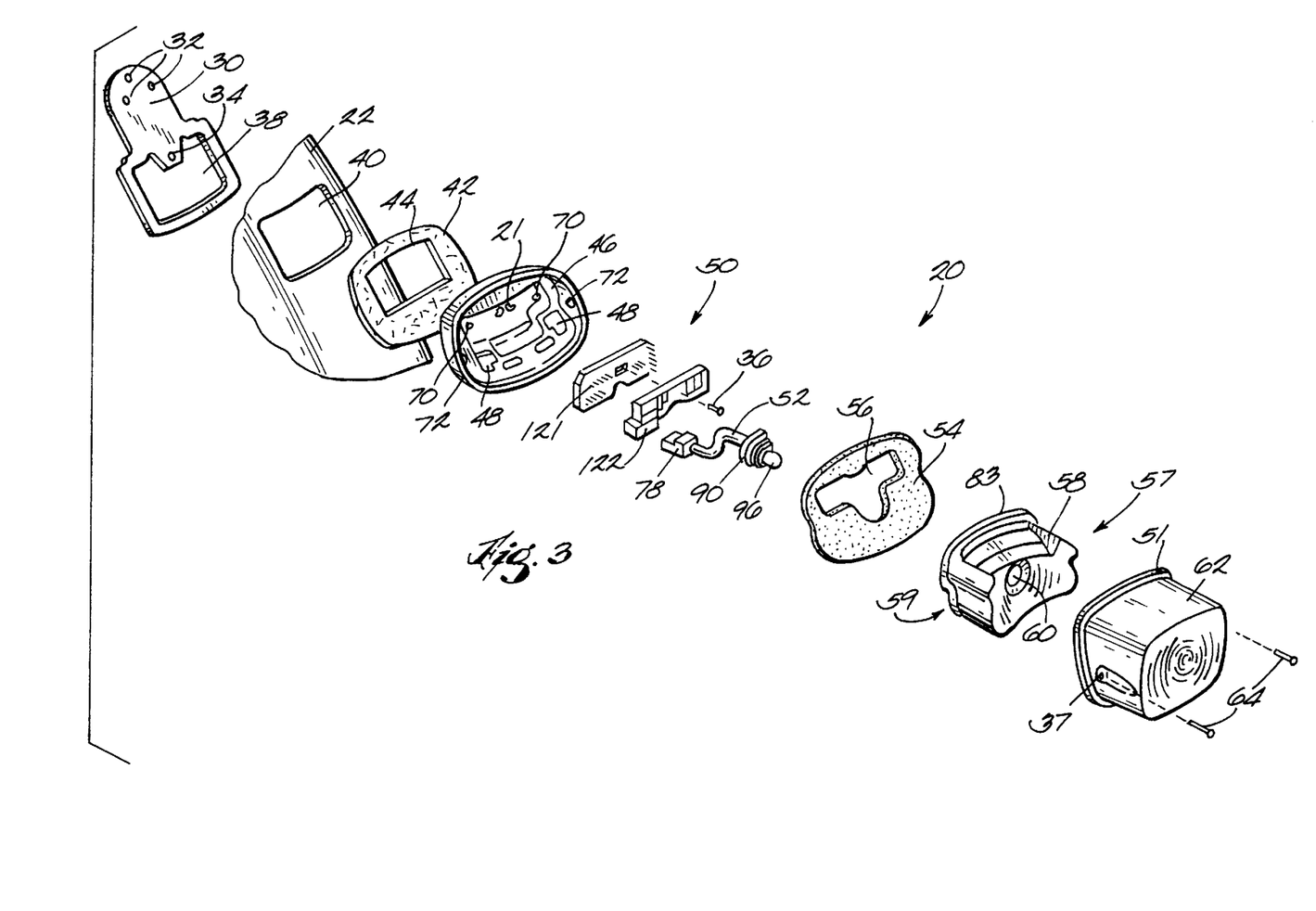
FIG. 3 is an exploded rear perspective view of the motorcycle tail light of FIG. 2.
Figure 4:
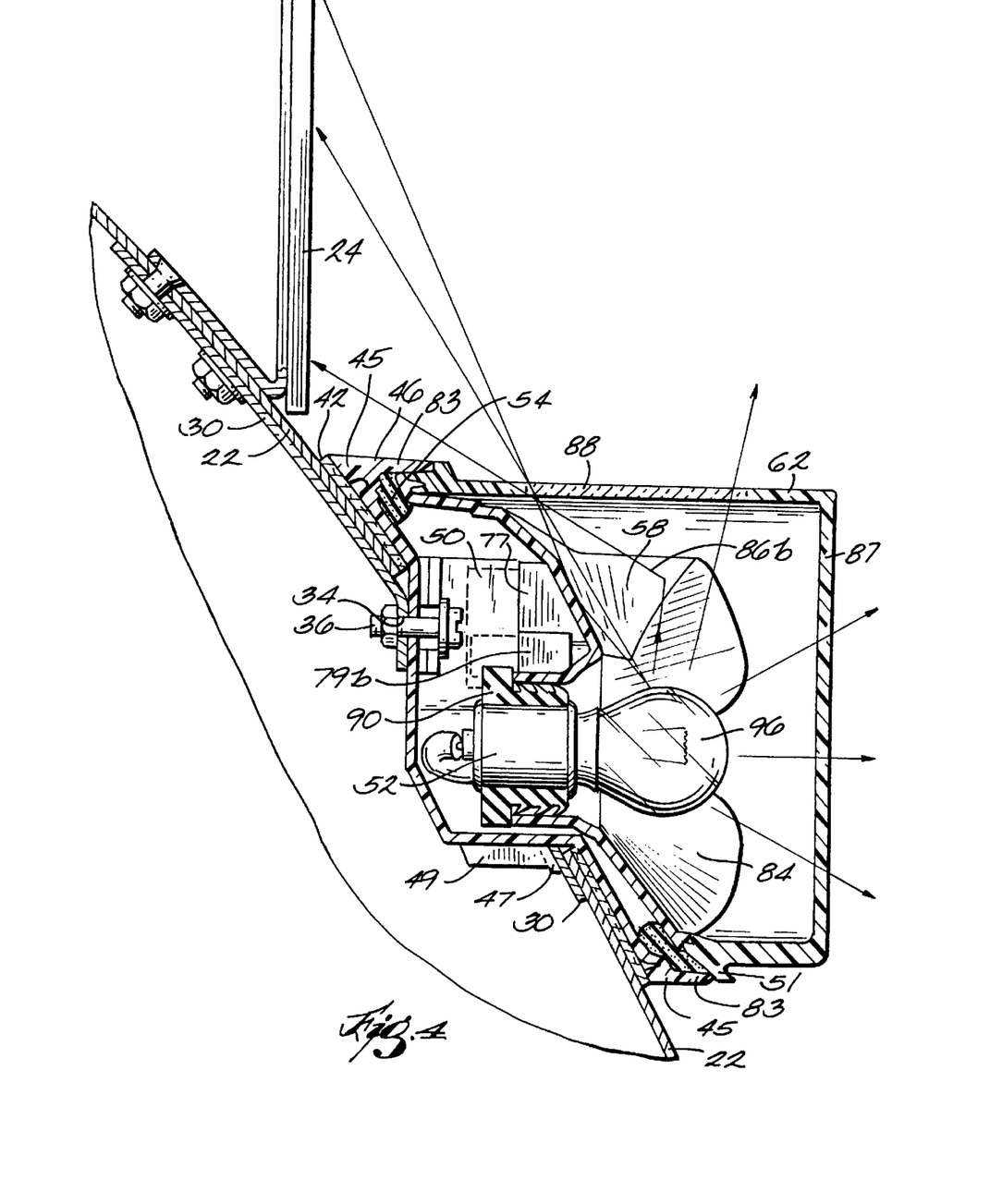
FIG. 4 is an enlarged side section view through the center of the tail light of FIG. 2.

As shown in FIGS. 3 and 4, the illustrated tail light 20 is secured to the rear fender 22 by using a mounting bracket 30. The mounting bracket 30 includes openings 32 which are used in conjunction with fasteners (not shown) to attach the mounting bracket 30 to the rear fender 22. Alternatively, the mounting bracket 30 can be welded or otherwise secured to the fender 22. The mounting bracket 30 includes an additional opening 34, which is capable of receiving a fastener 36 for securing the tail light 20 directly to the mounting bracket 30. The mounting bracket 30 also includes another opening 38, which is similar in size and shape to an opening 40 in the rear fender 22. The openings 38, 40 allow one or more wiring harnesses to extend from the tail light 20 to other parts of the motorcycle 10.

The illustrated tail light 20 generally includes a first gasket 42 adapted to be positioned against the fender 22, and a base 46 that compresses the first gasket 42 against the fender 22. A junction box 50 is mounted to the base 46 and electrically connects a light source assembly 52 to other electrical components. A second gasket 54 provides a seal between the base 46 and a light cavity 59, which includes a housing 57 and a lens 62.

More specifically, the first gasket 42 is made of a resilient material and provides a seal between the rear fender 22 and the base 46. The gasket 42 also includes an opening 44, which is similar in size and shape to the openings 38, 40 in the mounting bracket 30 and the rear fender 22. The first gasket 42 is preferably secured (e.g., bonded with adhesive) to the base 46.

Figure 5:
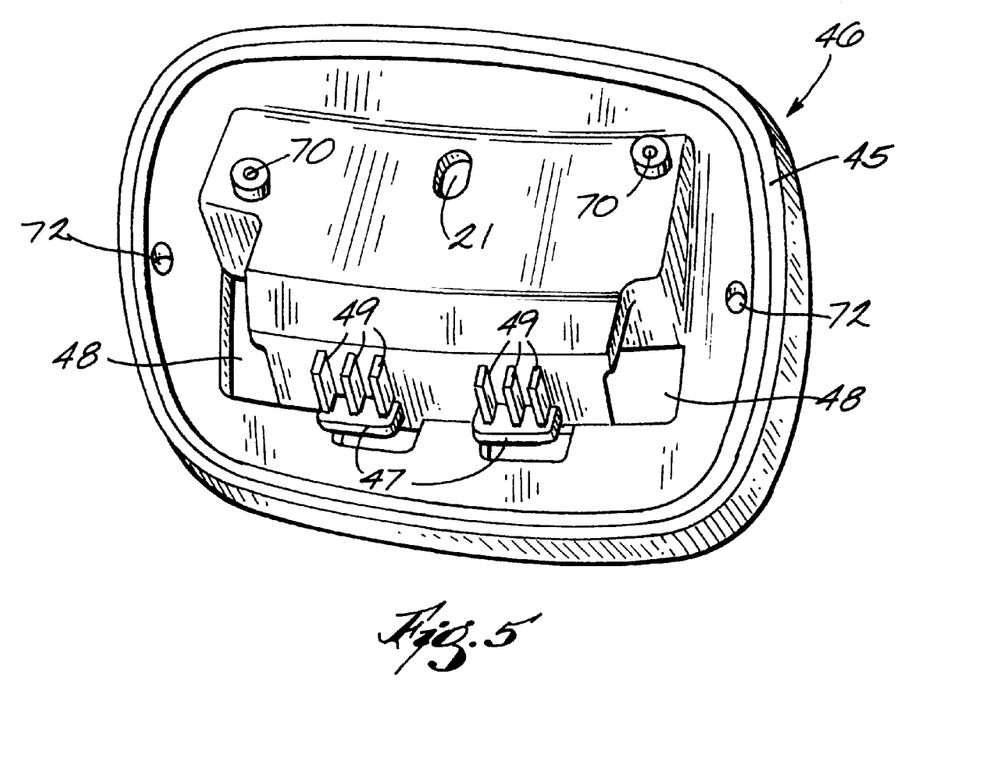
FIG. 5 is a front perspective view of a base of the tail light of FIG. 2.

Referring now particularly to FIGS. 3 and 5, the base 46 includes a flanged edge 45 that is positioned against the first gasket 42 when the tail light 10 is assembled to the rear fender 22. The base 46 further includes openings 48 for routing one or more wire harnesses into and out of the tail light 20. There are also openings 70 in the base 46 for receiving studs located on the back of the junction box 50 in order to mount the junction box 50 to the back side of the base 46. In addition, the base 46 also includes an opening 21 which receives the fastener 36 therethrough for mounting the base 46 to the fender 22. There are also additional openings 72 in the base 46 for receiving fasteners 64 that are used to secure the gasket 54 and the light cavity 59 to the base 46.

In the illustrated embodiment, the base 46 includes lips 47 that secure the tail light 20 to the mounting bracket 30 and the rear fender 22 (as shown in FIG. 4). Each of the lips 47 may be supported by a plurality of reinforcing ribs 49.

Figure 6:
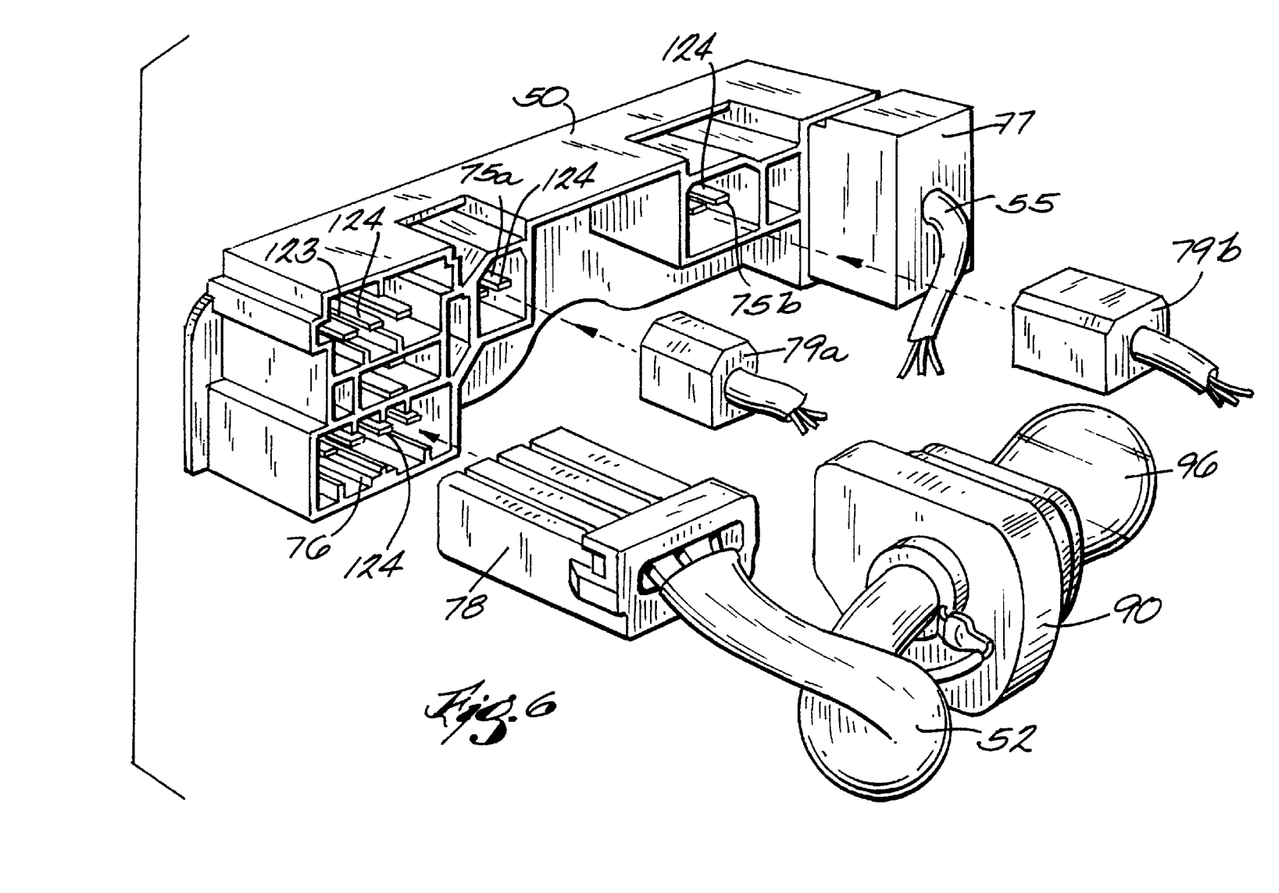
FIG. 6 is a rear perspective view of a junction box and various electrical connectors used in conjunction with the junction box.

Referring to FIGS. 3 and 6, the junction box 50 includes a circuit board 121 and a connector 122. The circuit board 121 includes a plurality of pins 124 that are electrically interconnected with each other. The connector 122 includes a plurality of holes (not shown) that are positioned to receive the pins 124 when the circuit board 121 and connector 122 are assembled. The connector 122 includes a socket 76 adapted to receive a first plug 78, which is part of the light source assembly 52. The connector 122 is also adapted to receive a second plug 77 that is attached to a main wire harness 55 through which electrical power is provided. The connector 122 may include additional sockets 75a, 75b that are adapted to mate with plugs 79a, 79b, which are electrically connected to the left and right indicator lights (not shown) of the motorcycle 10. In addition, the connector 122 can include an auxiliary socket 123 that is adapted to receive a plug (not shown) of an aftermarket item. The pins 124 in the auxiliary socket 123 are available to provide tail light and brake light power to an electrically powered motorcycle accessory.

Figure 7:
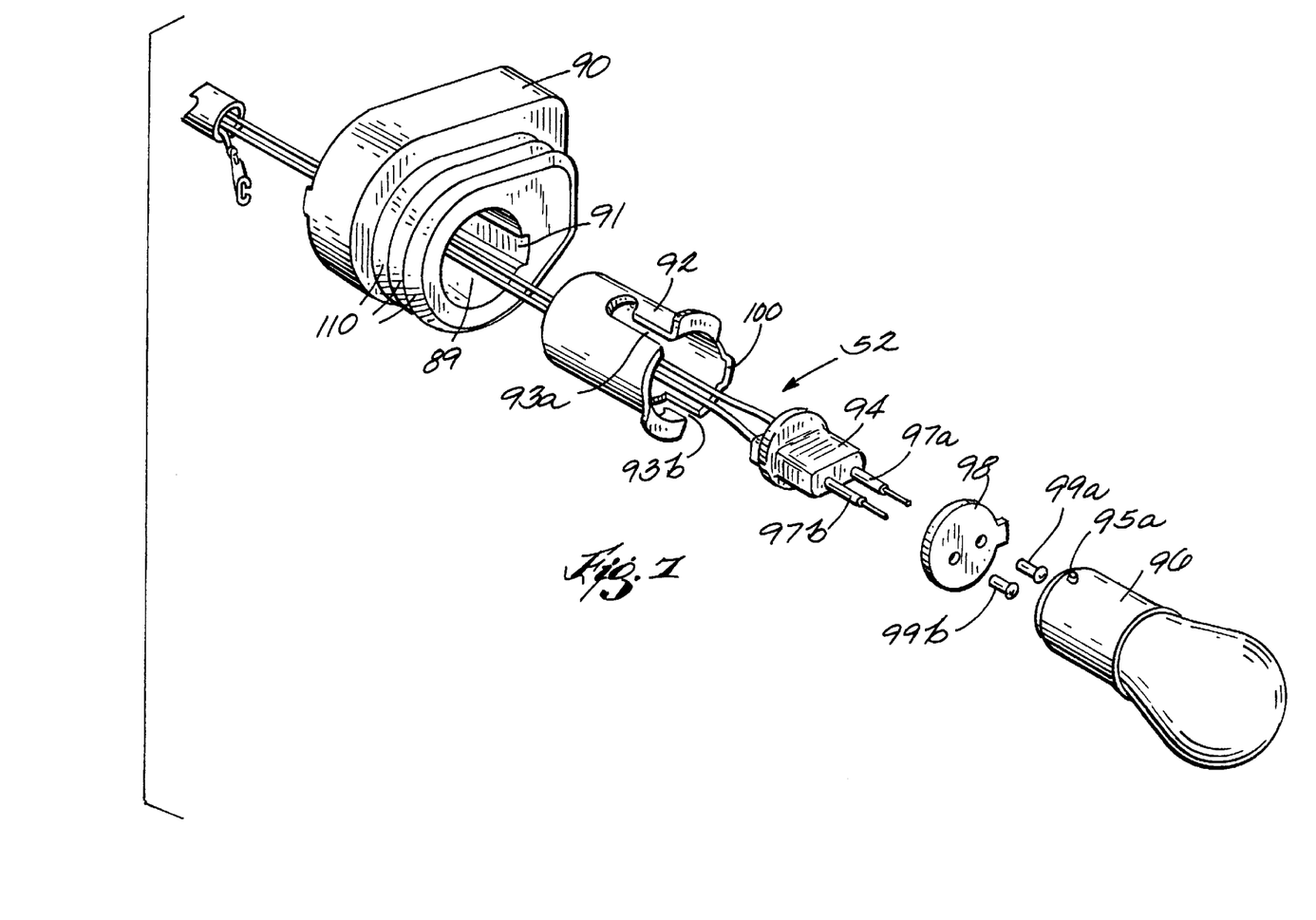
FIG. 7 is an exploded perspective view of a light source assembly used in the tail light of FIG. 2.

Referring now particularly to FIG. 7, the illustrated light source assembly 52 generally includes a resilient base 90 adapted to receive a frame 92. An elastomer member 94 is mounted within the frame 92 and is compressed when a light source 96 is forced against an insulator 98 to compress the elastomer member 94 and bias the light source 96 into a secure position within the frame 92.

More specifically, the resilient base 90 has an opening 89 adapted to receive the frame 92. The opening 89 in the resilient base 90 includes a slot 91 which is aligned with a channel 100 on the frame 92. The slot 91 and channel 100 configuration ensure proper alignment of the frame 92 within the resilient base 90. The illustrated resilient base 90 comprises an elastomer material having a durometer hardness of about 40. One preferred elastomer is ethylene propylene tert polymer (EPDM).

The resilient member 90 is formed in an asymmetric shape. The asymmetric shape ensures that the light source 96 is properly oriented within an opening 60 in the reflector 58 (see FIG. 12). As shown most clearly in FIG. 9, the asymmetric shape includes an arcuate portion 109 having an axis aligned with the axis of the opening 89 in the resilient base 90. The asymmetric shape further includes three straight surfaces 108a, 108b, 108c.

Figure 10:
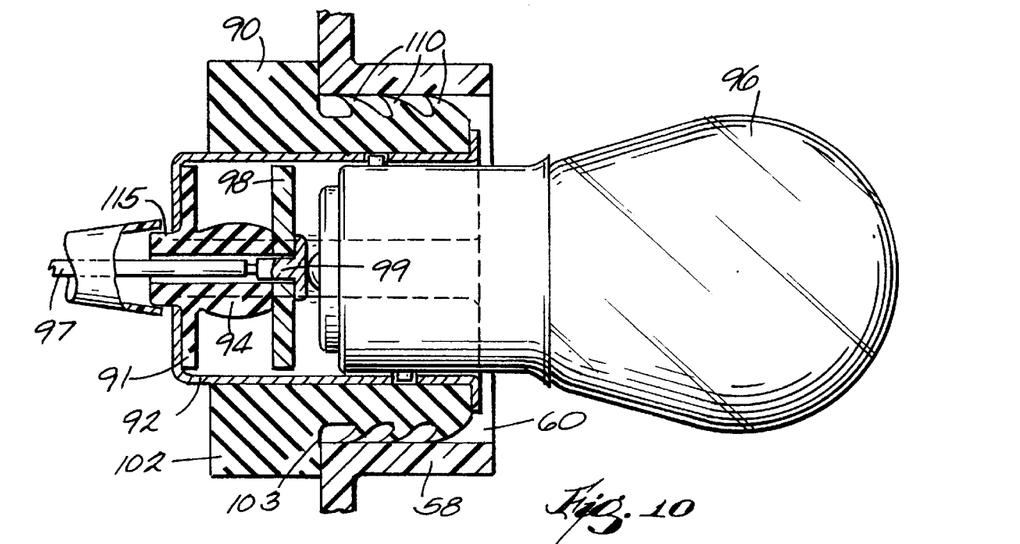
FIG. 10 is a side section view taken along the line 10—10 of FIG. 9 with a light source secured within the light source assembly and the light source assembly positioned in a housing.

The resilient base 90 has a plurality of ribs 110. The ribs 110 extend distally from an outer surface 114 of the resilient base 90. Each rib 110 includes a first surface 112 that extends outward perpendicularly from the outer surface 114, and a second surface 113 that extends outward toward the stop surface 103 at approximately a 45° angle from the outer surface 114. As shown in FIG. 10, when the resilient base 90 is inserted into the opening 60, the resilient ribs 110 compress and deflect in the direction of the stop surface 103. This configuration allows for easy insertion of the resilient base 90 into the opening 60 while making removal of the resilient base 90 more difficult (although still possible).

Figure 8:
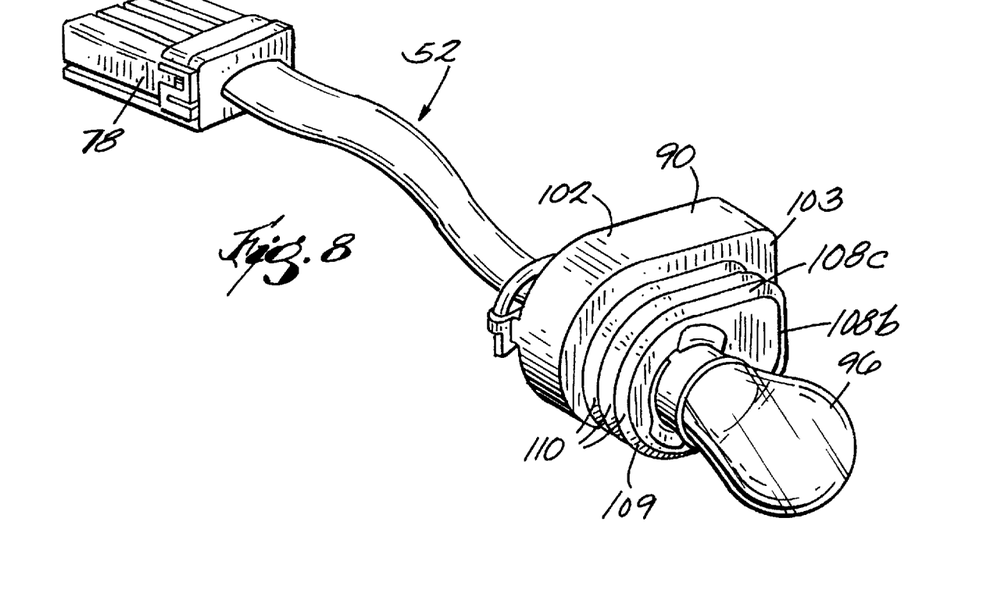
FIG. 8 is an assembled perspective view of the light source assembly of FIG. 7.
Figure 9:
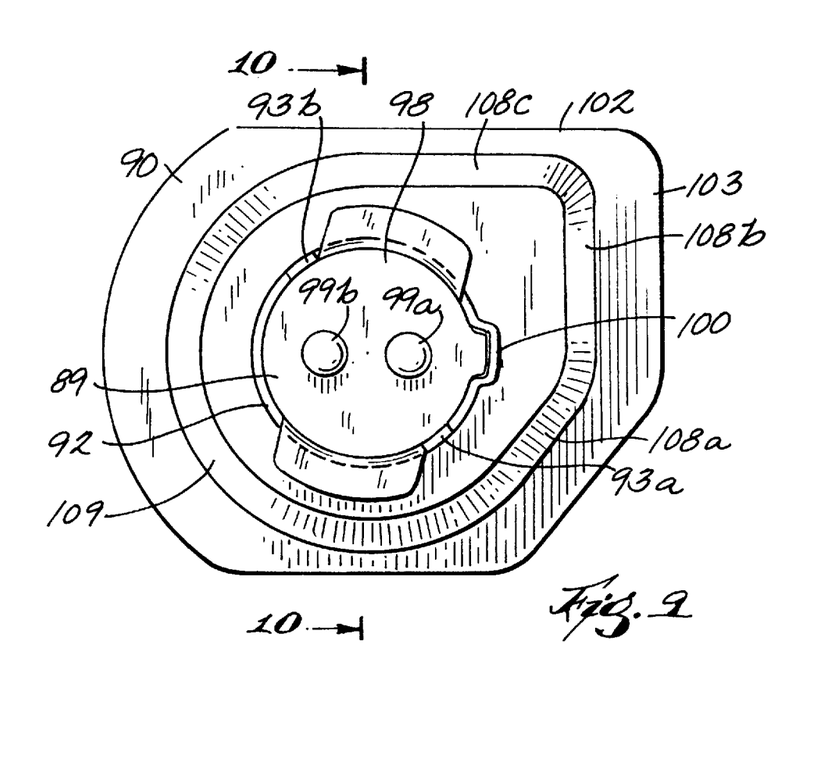
FIG. 9 is a rear view of a resilient base used in the light source assembly of FIG. 7.
Figure 12:
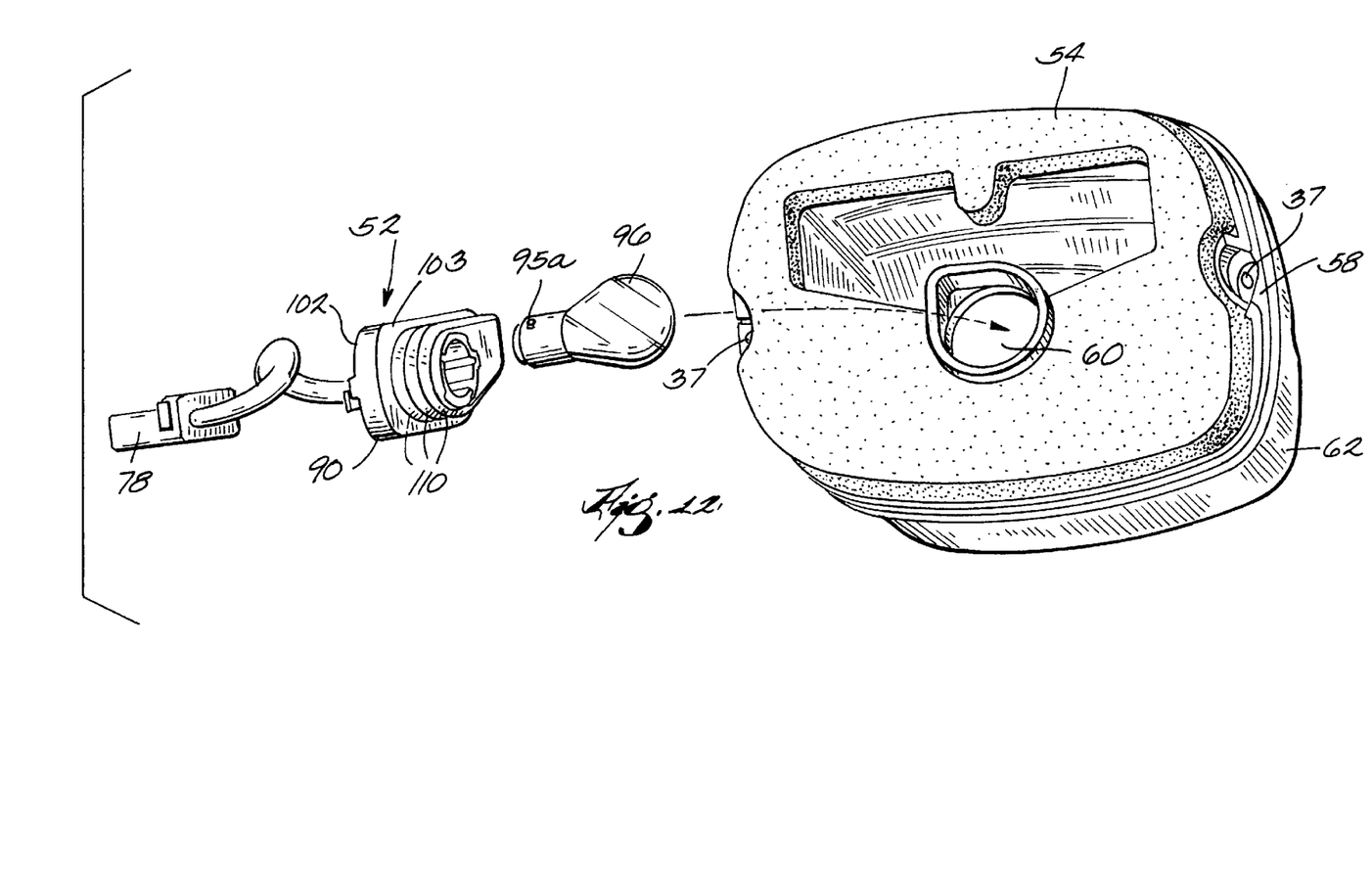
FIG. 12 is an exploded perspective view of the light source assembly and housing.

As shown in FIGS. 8, 9, and 12, the resilient base 90 further includes a stop portion 102 which has a stop surface 103. The stop portion 102 is larger than the opening 60 in the reflector 58 such that the light source assembly 52 can only be inserted into the opening 60 of the reflector 58 up to the stop surface 103 (see FIG. 10).

Figure 11:
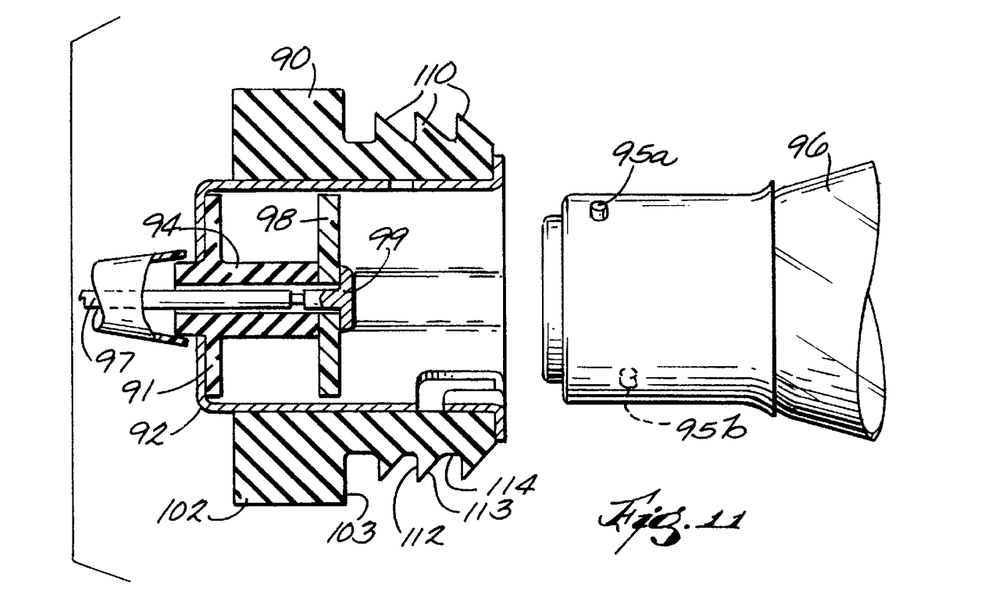
FIG. 11 is the section view of FIG. 10 with the light source removed from the light source assembly and the light source assembly removed from the housing.

Referring now particularly to FIGS. 10 and 11, the light source assembly 52 is shown with the light source 96 removed (FIG. 11) and inserted (FIG. 10). In addition, the resilient base 90 is shown removed from (FIG. 11), and inserted into (FIG. 10) the opening 60 in the reflector 58.

The frame 92 includes slots 93a and 93b that receive projections 95a, 95b on the light source 96 to ensure that the light source 96 is secured in the proper position within the frame 92. The frame 92 also includes an opening 115 through which wires 97a, 97b pass. The opening 115 is sealed within the elastomer member 94 when a circular section 91 (which is larger than the opening 115) of the elastomer member 94 is forced against the frame 92 by the light source 96.

The wires 97a, 97b extend through the elastomer member 94 in order to provide an electrical connection with the light source 96. In the illustrated embodiment, the wires 97a, 97b are attached to contacts 99a, 99b, or some other instrument, in order to facilitate electrical connection of the wires 97a, 97b.

The insulator 98 includes a projection 120 which also fits within the channel 100 of the frame 92 to ensure that the contacts 99a, 99b (which extend through the insulator 98), are properly aligned with respect to the frame 92.

The second gasket 54 is positioned against the rear surface 45 of the base 26 and includes an opening 56 for receiving the junction box 50 and the light source assembly 52 therethrough. Preferably, the second gasket 54 is secured (e.g., by adhesive) to the housing 57.

The light cavity 59 (which includes the housing 57 and the lens 62) is secured to the base 46 by fasteners 64 that are positioned through the openings 37 in the lens 62, and then secured into the openings 72 in the base 46. In this manner, the second gasket 54 is compressed between the base 46 and the light cavity 59.

Figure 13:
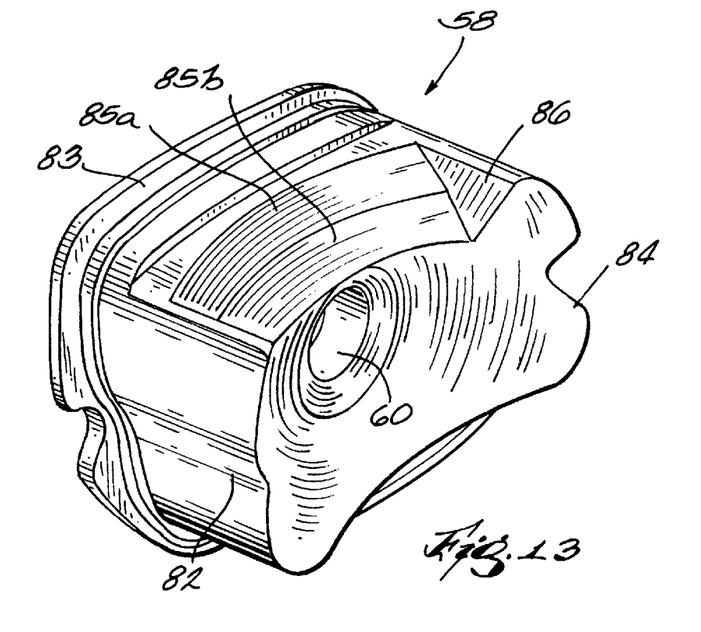
FIG. 13 is a rear perspective view of the housing.
Figure 14:
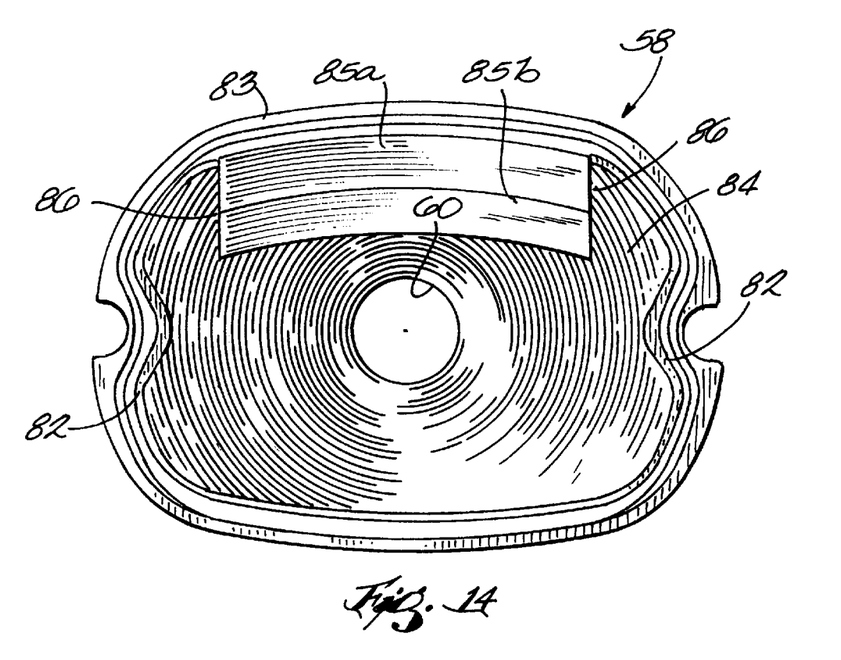
FIG. 14 is a rear view of the housing of FIG. 13.
Figure 15:
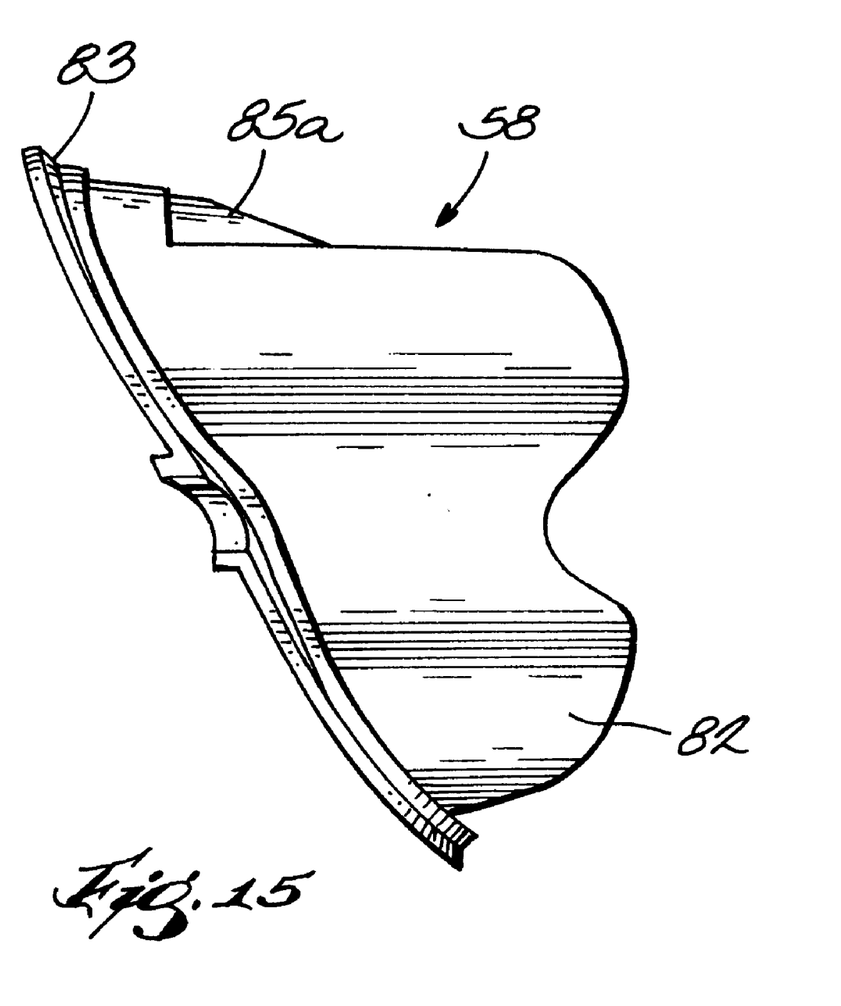
FIG. 15 is a side view of the housing of FIG. 13.

Referring now particularly to FIGS. 13, 14 and 15, the housing 57 is made of a generally oval configuration and has serpentine side walls 82 which are adapted to receive the fasteners 64 along side when the light cavity 59 is mounted to the base 46. The housing 57 has an outer flange 83 that mates with an outside flange 51 of the lens 62 on the back side and the second gasket 54 on the front side. Preferably, the outer flange 83 is secured (e.g., by adhesive or otherwise) to the flange 51 to form an integral and sealed light cavity 59.

In the illustrated embodiment, the housing 57 includes a reflector 58 having a variety of reflective surfaces that direct light from the light source 96 toward the license plate 24 and rearward through the lens 62. Among these reflective surfaces are slightly concave upper surfaces 85a, 85b, which are located on the same side of the tail light 20 as the license plate 24. The upper surfaces 85a, 85b serve to reflect light from the light source 96 upward toward the license plate 24 (see FIG. 4). In addition, the reflector 58 includes substantially triangular side surfaces 86 that are substantially parallel to an axis extending from the light source 96 to the license plate 24. These side surfaces 86 reflect additional light upward toward the license plate 24 (see FIG. 16). The reflector 58 further includes a substantially parabolic surface 84 that reflects light from the light source rearwardly through the lens 62.

Figure 16:
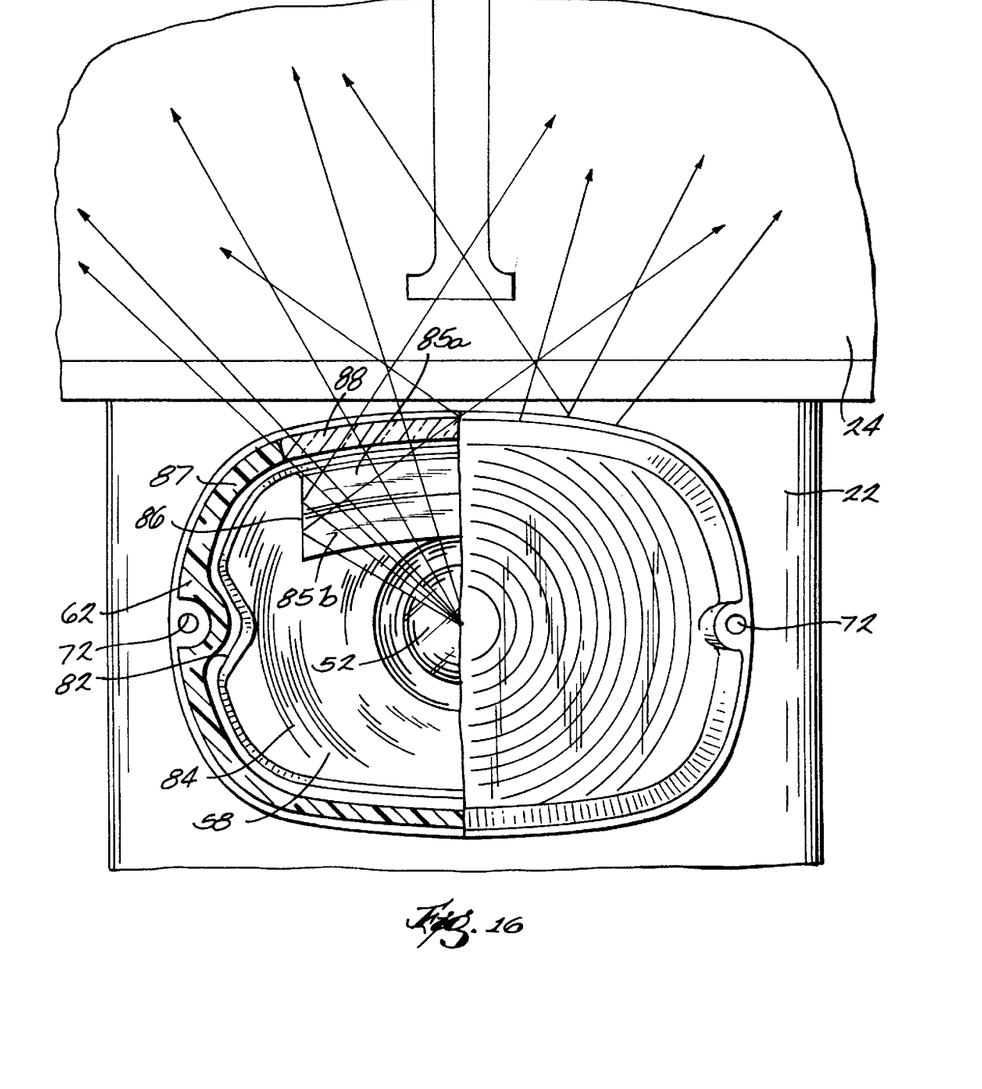
FIG. 16 is a rear partial section view of the tail light of FIG. 3.

As shown in FIG. 16, the reflector 58 is designed to work in conjunction with the lens 62. The lens 62 includes a colored portion 87 and a clear portion 88. In the illustrated embodiment, the reflective side surface 86 prevents (e.g., blocks) light from passing through the colored portion 87 of the lens 62 and reaching the license plate 24, while simultaneously allowing light to pass through the clear portion 88 and to the license plate 24. This configuration permits only "white" light to reach the license plate 24.

The foregoing description of the present invention has been presented for purposes of illustration and description, furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

While only a single embodiment of the invention has been illustrated and described, it is not intended to be limited thereby but only by the scope of the appended claims.

What is claimed is:

1. A motorcycle tail light comprising:

a housing having an asymmetrical opening;

a lens mounted to said housing; and a light source assembly including;

an asymmetrical base mounted within said asymmetrical opening such that said light source assembly can only be mounted within said housing in a single orientation, and a light source mounted to said asymmetrical base.

2. The motorcycle tail light of claim 1 wherein said base includes a recess in which said light source is mounted, said recess having a central axis, and wherein said base includes an arcuate portion having a center axis of curvature that substantially coincides with said central axis.

3. The motorcycle tail light of claim 2 wherein said base further includes at least three substantially straight portions.

4. A motorcycle tail light comprising:

a housing;

a lens mounted to said housing; and a light source assembly between said lens and said housing, said light source assembly comprising;

a base having an aperture, a light source mounted within said aperture, and an elastomer member positioned in said aperture and compressed between said light source and said base, such that said elastomer member biases said light source to hold said light source within said aperture.

5. The motorcycle tail light of claim 4 wherein said elastomer member includes an opening and said light source assembly further includes a wire extending through said opening in said elastomer into contact with said light source, said elastomer member providing a seal against said wire.

6. The motorcycle tail light of claim 4 wherein said base includes an opening, and wherein said elastomer member extends through said opening and seals said opening when said elastomer member is compressed between said light source and said base.

7. The motorcycle tail light of claim 6 wherein said elastomer member and said opening are substantially rectangular, and wherein said elastomer member further includes a circular section that is larger than said opening.

\* \* \* \* \*